G. A. WING.
Magazine Stove.
No. 105,535.           Patented July 19, 1870.
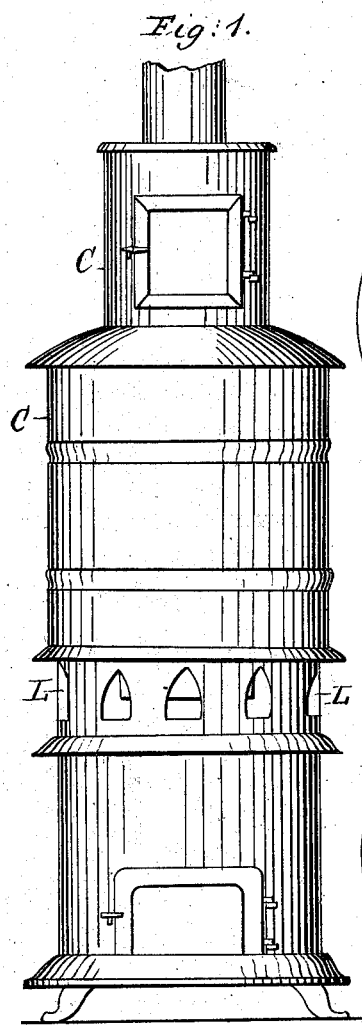
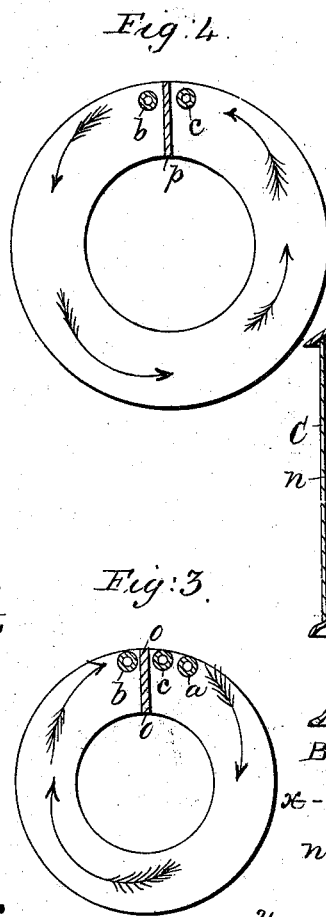
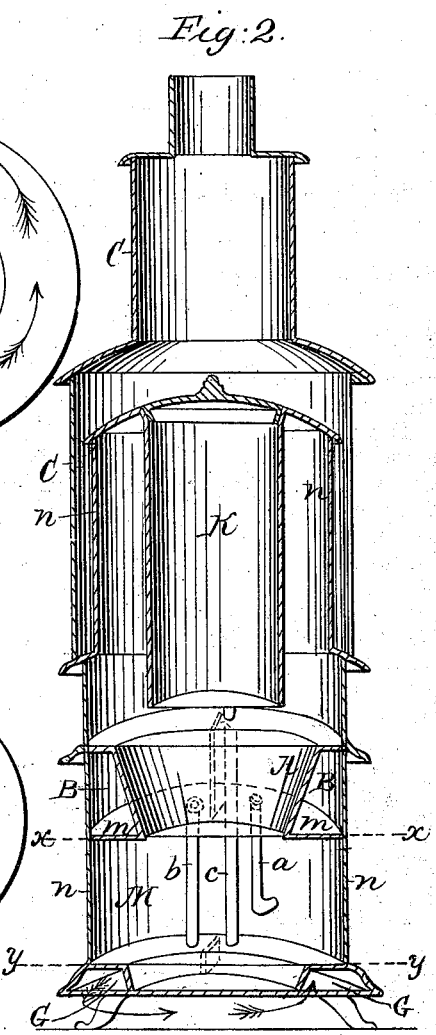
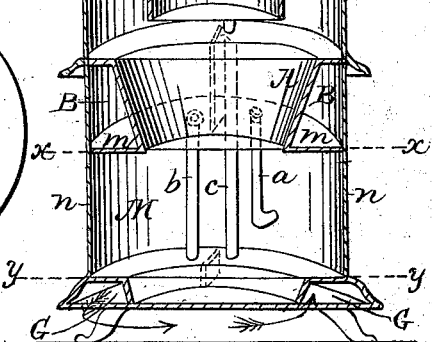
Witnesses.
John S. Bentham
John K. Finch
Inventor.
George A. Wing

UNITED STATES PATENT OFFICE.

GEORGE A. WING, OF ALBANY, NEW YORK.

IMPROVEMENT IN BASE-BURNING STOVES.

Specification forming part of Letters Patent No. 105,535, dated July 19, 1870; antedated July 12, 1870.

*To all whom it may concern:*

Be it known that I, GEORGE A. WING, of Albany, in the county of Albany and State of New York, have invented certain Improvements in Base-Heating Stoves, of which the following is a specification:

The first part of my invention relates to the mode of heating the base of heating-stoves without having recourse to diving-flues to pass the products of combustion into the base of the stove, as is now so generally done in base-burning stoves. The second part of my invention relates to the heating of upper rooms by conducting to them the air which is first heated in a chamber around the fire-pot, then conducted to the base, and thence to an upper casing surrounding the upper part of the stove.

In the accompanying drawings, Figure 1 is an elevation of a stove embodying my invention. Fig. 2 is a vertical section of the same. Fig. 3 is a horizontal section taken on the plane of a line, $x\ x$, in Fig. 2. Fig. 4 is a horizontal section taken on the plane of a line, $y\ y$, in Fig. 2.

A is the fire-pot, which has a plate, $m$, fitted to its bottom, and extending to the outer casing $n$ of the stove, and thus incloses a space or chamber, B, around the fire-pot. Said chamber B has a flue-pipe, $o$, in it, which prevents it from being a continuous circular chamber. On one side of flue-strip $o$ there is a tube or flue, $a$, communicating with the air of the room, and with the chamber B. On the other side of the flue-strip $o$ is another tube or flue, connecting chamber B with a flue, G, in the base of the stove. Leading from flue G in the base of the stove is a third flue, $c$. Said flue $c$ runs upward through chamber B, and outside of the outer casing $n$ of the stove. C is an outer casing or double heater, and incloses the upper part of the stove, and is for the purpose of heating upper rooms. The third flue $c$, it will be seen, is inclosed by the outer casing $n$ of the stove and the double heater-casing C.

If it is not desired to heat an upper room, the double heater-casing C may be dispensed with. In this case the heated air will warm the room in which the stove is placed.

Chamber G in the base of the stove is divided by a flue-strip, $p$, similarly to the chamber B by its flue-strip $o$. The direction taken by the heated air in passing around chamber G is the opposite of that in which it travels around chamber B, as shown in Figs. 3 and 4. Chamber G may be extended across the whole base of the stove, but I think it is better to confine it to the outer part of the base, as shown in Fig. 2.

It will be seen from the above that cold air entering into flue $a$ will become heated by passing into chamber B outside of the fire-pot A, and having passed around said chamber B and become heated, it will then pass through flue $b$ into chamber G in the base of the stove, and thence through flue $c$ out into the same room again, or into an upper room, as may be desired.

I claim as my invention—

1. The combination and arrangement of flues $a$, $b$, and $c$, and chamber B, surrounding the fire-pot A, with a chamber, G, in the base of the stove.

2. The combination and arrangement of an upper casing, C, with flue $c$ and chamber G, when said chamber G is heated by air passing from chamber B, in the manner substantially as herein shown.

GEORGE A. WING.

Witnesses:
JOHN S. BANTHAM,
JOHN K. FINCK.